(12) United States Patent
Lymberopoulos et al.

(10) Patent No.: US 11,982,370 B2
(45) Date of Patent: May 14, 2024

(54) ACTUATOR ASSEMBLIES AND RELATED METHODS FOR VALVE SYSTEMS

(71) Applicant: SAFOCO, INC., Houston, TX (US)

(72) Inventors: David Lymberopoulos, Houston, TX (US); Andrew Allen Kadavy, Houston, TX (US)

(73) Assignee: SAFOCO, INC., Houston, TX (US)

( * ) Notice: Subject to any disclaimer, the term of this patent is extended or adjusted under 35 U.S.C. 154(b) by 0 days.

(21) Appl. No.: 17/592,098

(22) Filed: Feb. 3, 2022

(65) Prior Publication Data

US 2023/0243437 A1 Aug. 3, 2023

(51) Int. Cl.
| F16K 31/122 | (2006.01) |
| F15B 15/14 | (2006.01) |
| F15B 15/28 | (2006.01) |
| F16K 37/00 | (2006.01) |

(52) U.S. Cl.
CPC ...... *F16K 31/1225* (2013.01); *F15B 15/1409* (2013.01); *F15B 15/2807* (2013.01); *F16K 37/00* (2013.01)

(58) Field of Classification Search
CPC .............. F16K 31/122; F16K 31/1225; F16K 37/0033; F16K 37/0041; F16K 37/00; F15B 11/036; F15B 15/1409; F15B 15/1476; F15B 15/2807; F15B 20/00; F15B 20/004; F15B 20/008; F15B 21/006; F15B 2211/6336; F15B 2211/7055; F15B 2211/7653; F15B 2211/8603
USPC ........................................................ 137/554
See application file for complete search history.

(56) References Cited

U.S. PATENT DOCUMENTS

| 3,469,503 | A | * | 9/1969 | Halderman, Jr. | ..... F15B 11/123 92/65 |
| 7,155,896 | B2 | * | 1/2007 | Jansen | ..... F02C 7/232 60/734 |
| 8,714,515 | B2 | * | 5/2014 | Nannan | ..... F15B 9/03 137/553 |
| 9,103,465 | B2 | | 8/2015 | Lymberopoulos | |
| 9,163,619 | B2 | | 10/2015 | Lymberopoulos | |
| 9,441,453 | B2 | | 9/2016 | Lymberopoulos et al. | |
| 9,671,794 | B1 | | 6/2017 | Lymberopoulos et al. | |
| 9,890,609 | B2 | | 2/2018 | Lymberopoulos et al. | |
| 11,384,876 | B2 | | 7/2022 | Kadavy | |
| 11,506,006 | B2 | | 11/2022 | Lymberopoulos et al. | |
| 11,519,536 | B2 | | 12/2022 | Lymberopoulos et al. | |
| 11,530,601 | B2 | | 12/2022 | Lymberopoulos et al. | |

(Continued)

*Primary Examiner* — Kevin F Murphy
*Assistant Examiner* — Jonathan J Waddy
(74) *Attorney, Agent, or Firm* — Patterson + Sheridan, LLP (57) ABSTRACT

Aspects of the present disclosure relate to fail open or fail close actuator assemblies and related methods for valve systems. In one implementation, an actuator assembly for valves includes an outer housing that includes an inner surface at least partially defining an internal volume. The actuator assembly includes one or more first fluid openings formed in the outer housing, one or more second fluid openings formed in the outer housing, and one or more ambient openings formed in the outer housing. The actuator assembly includes a valve stem disposed at least partially in the internal volume, and a first piston disposed in the internal volume and coupled to the valve stem. The actuator assembly includes a second piston disposed in the internal volume and disposed about the valve stem.

18 Claims, 7 Drawing Sheets

(56) References Cited

U.S. PATENT DOCUMENTS

| | | | | |
|---|---|---|---|---|
| 2002/0053651 A1* | 5/2002 | Fukano | ............... | F16K 31/1225 |
| | | | | 251/63.5 |
| 2005/0242312 A1* | 11/2005 | Kajitani | .................... | F16K 1/54 |
| | | | | 251/63.6 |
| 2008/0011974 A1* | 1/2008 | Brenes | ................ | F16K 31/1225 |
| | | | | 251/333 |
| 2010/0187454 A1* | 7/2010 | Arnold | ................ | F16K 31/1225 |
| | | | | 251/89 |
| 2011/0155937 A1* | 6/2011 | Arnold | .................. | F15B 20/004 |
| | | | | 251/69 |
| 2016/0273675 A1* | 9/2016 | Porath | ....................... | F16K 1/12 |
| 2018/0100588 A1* | 4/2018 | Ferreira | ................ | F16K 3/0254 |
| 2021/0372532 A1* | 12/2021 | Tanno | .................... | F16K 27/02 |

* cited by examiner

ACTUATOR ASSEMBLIES AND RELATED METHODS FOR VALVE SYSTEMS

BACKGROUND

Field

Aspects of the present disclosure relate to actuator assemblies and related methods for valve systems.

Description of the Related Art

Flow valves can be limited in operation, and can fail during operation. For example, obstructions such as sand can limit valves to where the valves do not fully open or do not fully close. The failures can limit operational flow rates for the flow valves and can limit operational modularity for the flow valves. As another example, the limited operations can limit the type of fluids that flow through the valves.

Therefore, there is a need in the art for actuators of valves that facilitate operation during failures, reliable achievement of flow rates, modularity in application, variances in flow rates, and variances in fluids used.

SUMMARY

Aspects of the present disclosure relate to fail open or fail close actuator assemblies and related methods for valve systems.

In one implementation, an actuator assembly for valves includes an outer housing that includes an inner surface at least partially defining an internal volume. The actuator assembly includes one or more first fluid openings formed in the outer housing, one or more second fluid openings formed in the outer housing, and one or more ambient openings formed in the outer housing. The actuator assembly includes a valve stem disposed at least partially in the internal volume, and a first piston disposed in the internal volume and coupled to the valve stem. The actuator assembly includes a second piston disposed in the internal volume and disposed about the valve stem.

In one implementation, a method of actuating a valve includes releasing a first pressurized fluid from a first chamber volume between a first piston and an outer housing. The first pressurized fluid is released through one or more first fluid openings formed in the outer housing. The first piston is disposed in the outer housing. The releasing of the first pressurized fluid includes pressurizing a second side of the first piston relative to a first side of the first piston using an ambient pressure through one or more ambient openings formed in the outer housing. The releasing of the first pressurized fluid includes moving the first piston to move a valve stem coupled to the first piston to an open position or a closed position. The method includes supplying a second pressurized fluid to a second chamber volume between a second piston disposed in the outer housing and a baseplate coupled to the outer housing. The second pressurized fluid is supplied through one or more second fluid openings formed in the outer housing. The supplying of the second pressurized fluid includes moving the second piston to stop the second piston against the first piston. The moving of the second piston includes translating the second piston relative to the valve stem.

In one implementation, a valve system includes an actuator assembly. The actuator assembly includes an outer housing that includes an inner surface at least partially defining an internal volume. The actuator assembly includes a baseplate coupled to the outer housing, one or more first fluid openings formed in the outer housing, and one or more second fluid openings formed in the outer housing. The actuator assembly includes one or more ambient openings formed in the outer housing, a valve stem disposed at least partially in the internal volume, and an actuator stem disposed at least partially in the internal volume. The actuator assembly includes a first piston disposed in the internal volume and coupled to the valve stem and the actuator stem, and a second piston disposed in the internal volume and disposed about the valve stem. The valve system includes one or more first hydraulic lines in fluid communication with the one or more first fluid openings, and one or more second hydraulic lines in fluid communication with the one or more second fluid openings. The valve system includes a controller comprising instructions that, when executed, cause releasing of a first pressurized fluid through the one or more first fluid openings and from a first chamber volume between the first piston and the outer housing. The instructions, when executed, further cause supplying of a second pressurized fluid through the one or more second fluid openings and to a second chamber volume between the second piston and the baseplate.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to fail open or fail close actuator assemblies and related methods for valve systems. In one implementation, an actuator assembly for valves includes an outer housing that includes an inner surface at least partially defining an internal volume. The actuator assembly includes one or more first fluid openings formed in the outer housing, one or more second fluid openings formed in the outer housing, and one or more ambient openings formed in the outer housing. The assembly includes a valve stem disposed at least partially in the internal volume, and a first piston disposed in the internal volume and coupled to the valve stem. The actuator assembly includes a second piston disposed in the internal volume and disposed about the valve stem. In one implementation, a controller includes instructions that, when executed, cause releasing of a first pressurized fluid through the one or more first fluid openings and from a first chamber volume between the first piston and the outer housing. The instructions, when executed, further cause supplying of a second pressurized fluid through the one or more second fluid openings and to a second chamber volume between the second piston and the baseplate. Although described herein with respect to a "fail open" actuator assembly, e.g. an actuator that moves a valve to the open position in the event of a failure or some other triggering event, the embodiments of the disclosure may be equally applied to a "fail close" actuator assembly, e.g. an actuator that moves a valve to the closed position in the event of a failure or some other triggering event.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 1:
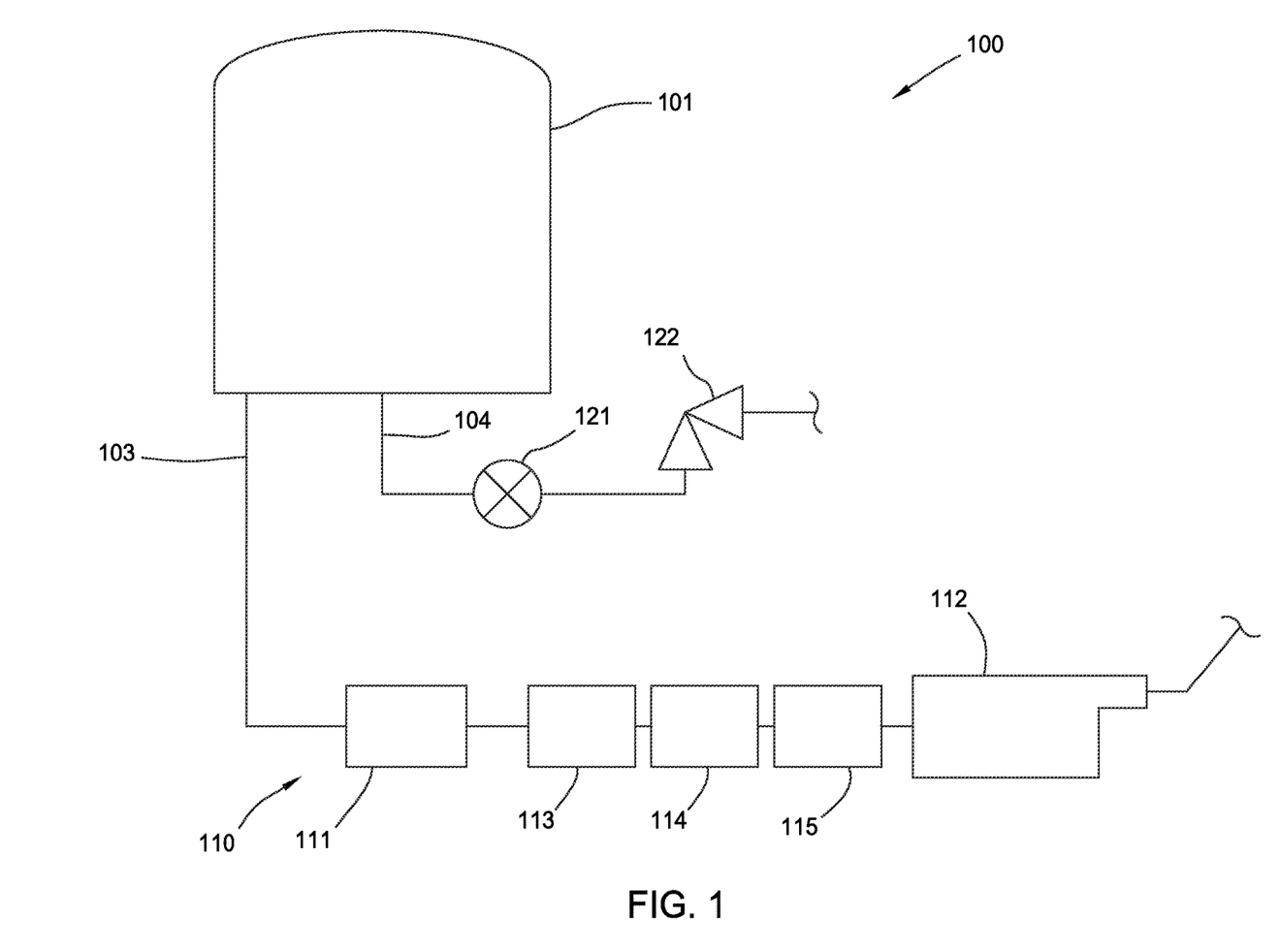
FIG. 1 is a schematic plan view of a valve system coupled to a solids separator, according to one implementation.

FIG. 1 is a schematic plan view of a valve system 110 coupled to a solids separator 101, according to one implementation. The valve system 110 and the solids separator 101 are part of a separation system 100. The valve system 110 is disposed along a first outlet line 103 coupled to the solids separator 101. A second outlet line 104 is coupled to the solids separator 101.

The solids separator 101 is configured to separate solids (such as sand) from fluids (such as oil or gas). The separated solids exit the solids separator 101 through the second outlet line 104. The separated fluids exit the solids separator 101 through the first outlet line 103. The second outlet line 104 includes one or more valves 121, 122 (two are shown). A first valve 121 is a ball valve. The first valve 121 can be a relief valve or an excess flow valve. A second valve 122 is an angle valve.

The first outlet line 103 includes one or more valves 111, 112 (two are shown). A first valve 111 can be an indicator valve that indicates flow. A second valve 112 can be a choke valve. The first outlet line 103 also includes a first fail open valve 113, a second fail open valve 114, and a fail close valve 115, which are positioned between the first and second valves 111, 112.

Figure 2:
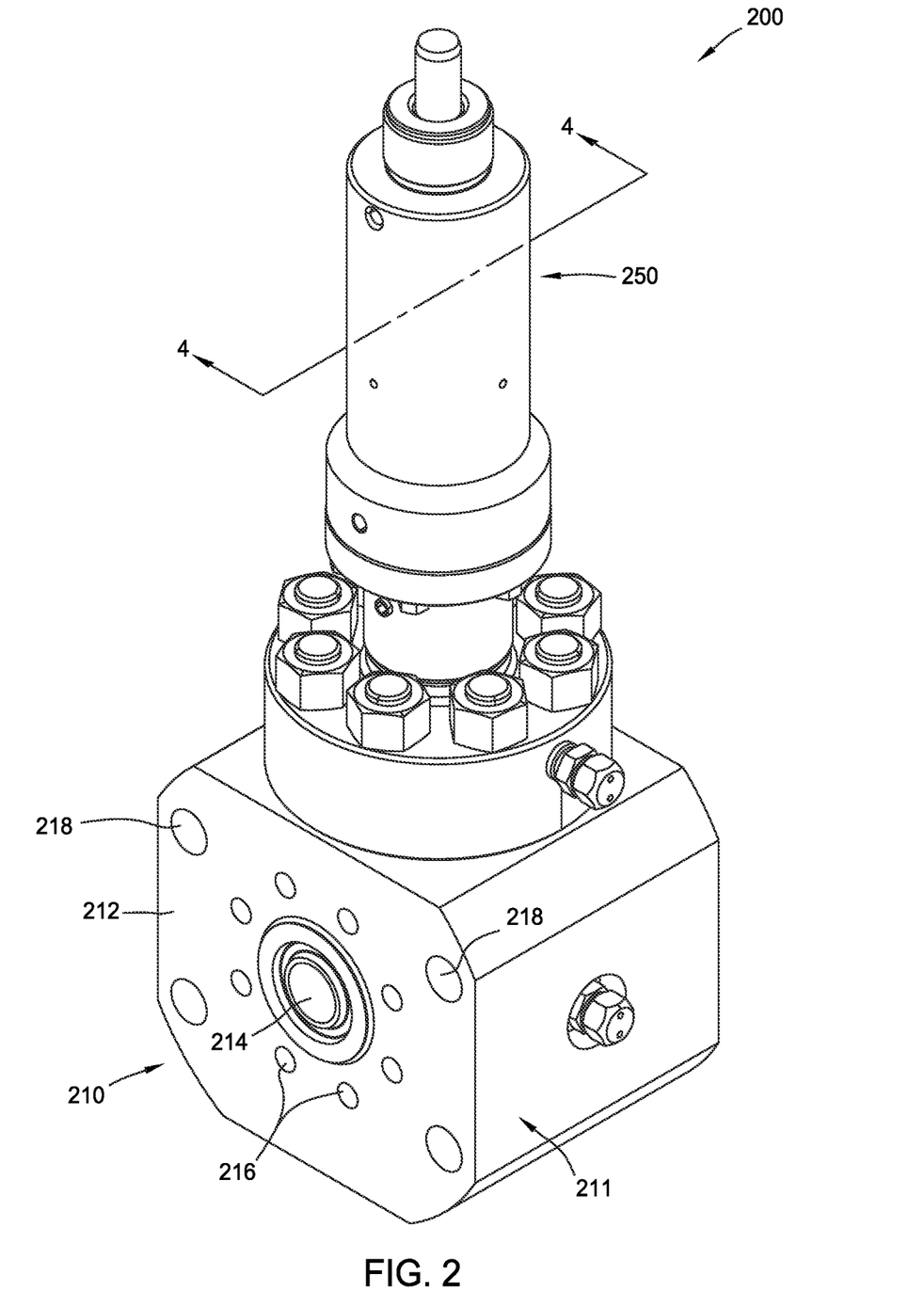
FIG. 2 is a schematic isometric front view of a valve system, according to one implementation.
Figure 3:
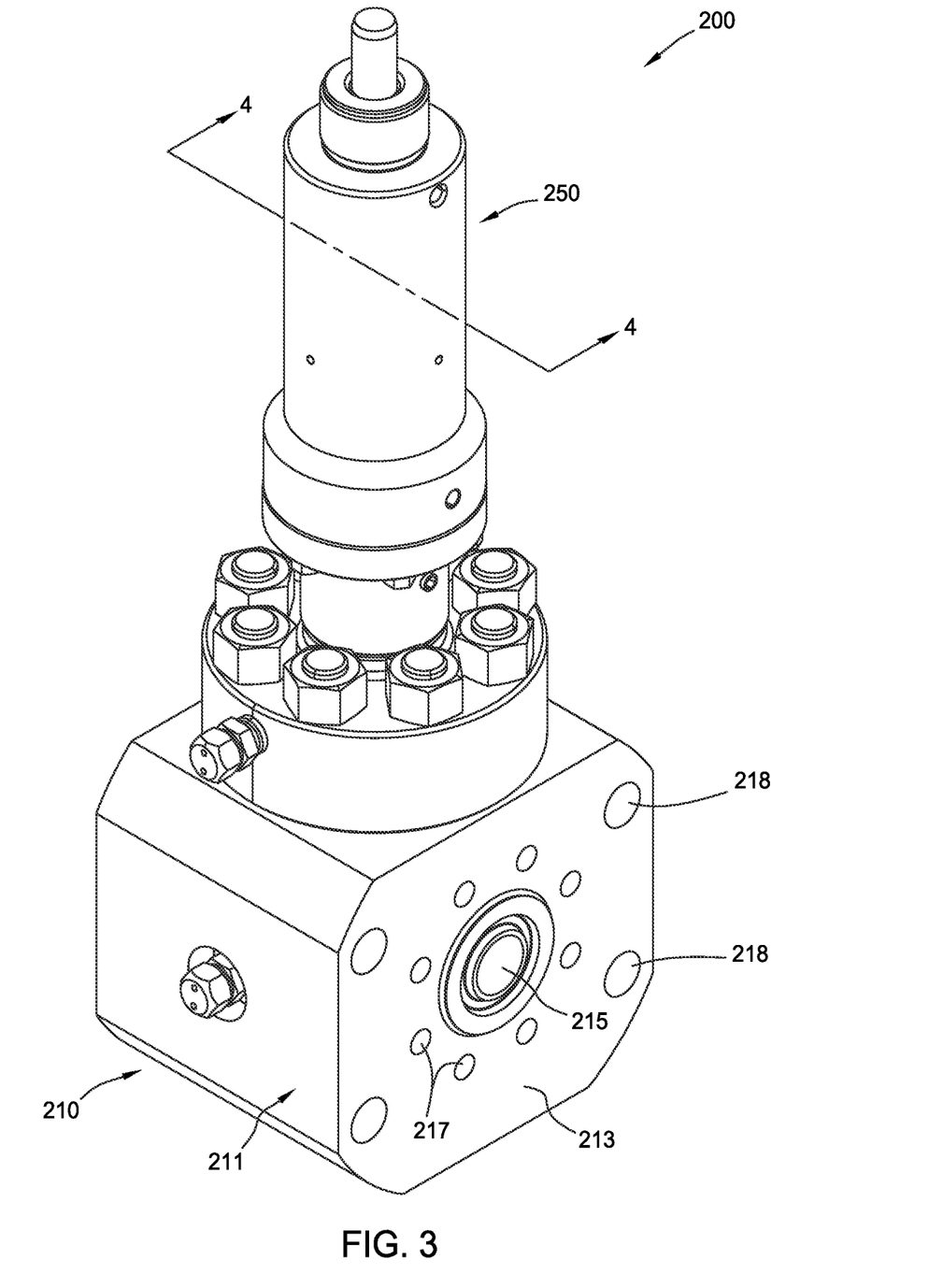
FIG. 3 is a schematic isometric back view of the valve system shown in FIG. 2, according to one implementation.

FIG. 2 is a schematic isometric front view of a valve system 200, according to one implementation. FIG. 3 is a schematic isometric back view of the valve system 200 shown in FIG. 2, according to one implementation. The valve system 200 includes a valve 210 and a fail open actuator assembly 250 coupled to the valve 210. Although the actuator assembly 250 is described herein as a "fail open actuator," the embodiments of the actuator assembly 250 may be modified so that the actuator assembly 250 is a "fail close actuator." In other words, the embodiments of the actuator assembly 250 may be configured so that the actuator assembly 250 moves the valve 210 to a closed position in the event of a failure.

One or more aspects, features, components, and/or properties of the valve system 200 can be used as part of one or more of the valves of the separation system 100 shown in FIG. 1, such as the first fail open valve 113 and/or the second fail open valve 114. One or more aspects, features, components, and/or properties of the valve system 200 can be used as part of other valves, such as other gate valves and/or the fail close valve 115.

The valve 210 is a gate valve. The valve 210 includes a gate block 211. The gate block 211 includes a first gate side face 212 and a second gate side face 213. The gate block 211 includes a first central opening 214 extending into the first gate side face 212 and a second central opening 215 extending into the second gate side face 213. The gate block 211 includes a plurality of first gate openings 216 disposed outwardly of the first central opening 214 and extending partially into the first gate side face 212. The gate block 211 includes a plurality of second gate openings 217 disposed outwardly of the second central opening 215 and extending partially into the second gate side face 213. The gate block 211 includes a plurality of third gate openings 218 disposed outwardly of the plurality of first gate openings 216 and outwardly of the plurality of second gate openings 217.

Figure 4:
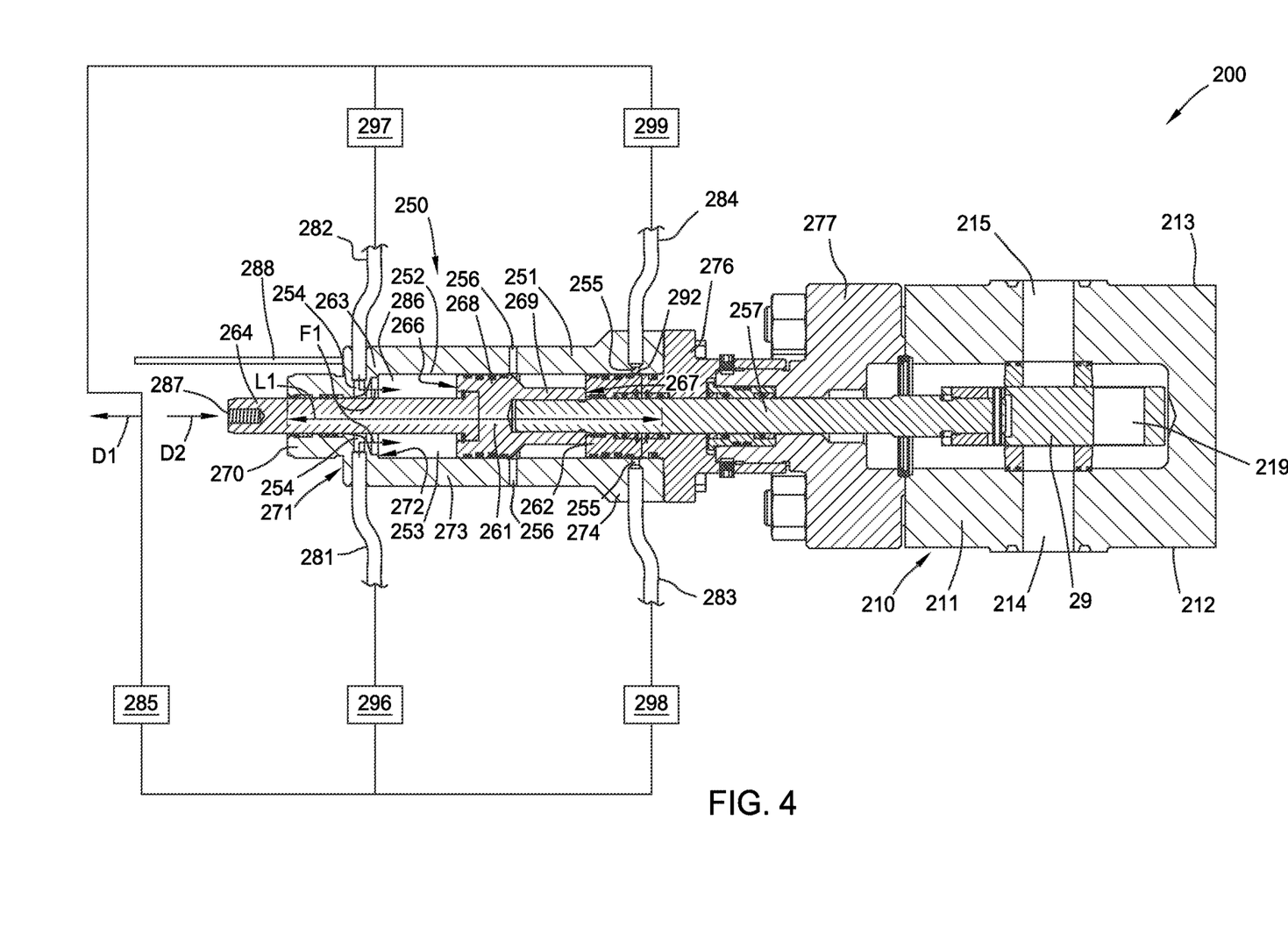
FIG. 4 is a schematic cross-sectional view, along Section 4-4, of the valve system shown in FIGS. 2 and 3 in a closed position, according to one implementation.

FIG. 4 is a schematic cross-sectional view, along Section 4-4, of the valve system 200 shown in FIGS. 2 and 3, according to one implementation. The valve system 200 is shown in a closed position. The valve 210 includes a movable gate 29 positioned within the gate block 211. The movable gate 29 includes a gate opening 219 configured to align with the first central opening 214 of the gate block 211 and the second central opening 215 of the gate block 211.

The fail open actuator assembly 250 includes an outer housing 251. The outer housing 251 includes an inner surface 252 at least partially defining an internal volume 253. The fail open actuator assembly 250 includes one or more first fluid openings 254 formed in the outer housing 251, one or more second fluid openings 255 formed in the outer housing 251, and one or more ambient openings 256 formed in the outer housing 251. The one or more ambient openings 256 are disposed between the one or more first fluid openings 254 and the one or more second fluid openings 255 along a longitudinal length L1 of the outer housing 251.

The fail open actuator assembly 250 includes a valve stem 257 disposed at least partially in the internal volume 253, and a first piston 261 disposed in the internal volume 253 and coupled to the valve stem 257. The fail open actuator assembly 250 includes a second piston 262 disposed in the internal volume 253 and disposed about the valve stem 257.

The outer housing 251 includes an inner shoulder portion 263. The first piston 261 is disposed between the second piston 262 and the inner shoulder portion 263. The fail open actuator assembly 250 includes an actuator stem 264 coupled to a first side 266 of the first piston 261. The valve stem 257 is coupled to a second side 267 of the first piston 261. The first piston 261 includes a head portion 268 and a rod portion 269. The actuator stem 264 is coupled to the head portion 268, and the valve stem 257 is coupled to the rod portion 269. The outer housing 251 includes an outer protruding portion 270 extending relative to a first side 271 of the inner shoulder portion 263, and a sleeve portion 273 extending relative to a second side 272 of the inner shoulder portion 263. The outer housing 251 includes an outer shoulder portion 274. The sleeve portion 273 extends between the outer shoulder portion 274 and the inner shoulder portion 263. The sleeve portion 273 and the outer shoulder portion 274 have the inner surface 252. The fail open actuator assembly 250 includes a baseplate 276 coupled to the outer housing 251. A flange plate 277 is coupled to the baseplate 276 and the gate block 211.

The one or more first fluid openings 254 are formed in the inner shoulder portion 263. The one or more ambient openings 256 are formed in the sleeve portion 273. The one or more second fluid openings 255 are formed in the outer shoulder portion 274.

The valve system 200 includes one or more first hydraulic lines 281, 282 in fluid communication with the one or more first fluid openings 254, and one or more second hydraulic lines 283, 284 in fluid communication with the one or more second fluid openings 255. The valve system 200 includes a controller 285. The controller 285 is configured to control operation of the actuator assembly 250 as described herein.

A first pressurized fluid F1 is supplied to the internal volume 253 on the first side 266 of the first piston 261 to facilitate maintaining the valve 210 in the closed position. The first pressurized fluid F1 is supplied through the one or more first hydraulic lines 281, 282 and the one or more first fluid openings 254. The controller 285 includes instructions that, when executed, cause releasing of the first pressurized fluid F1 through the one or more first fluid openings 254 and from a first chamber volume 286 between the first piston 261 and the outer housing 251. The first chamber volume 286 is a part of the internal volume 253. The releasing of the first pressurized fluid F1 from the first chamber volume 286 facilitates moving the first piston 261 toward the inner shoulder portion 263 of the outer housing 251 and to an outward position shown in FIG. 5. An ambient pressure of an ambient fluid (such as atmospheric air) applies a differential pressure to the first piston 261 through the one or more ambient openings 256. The differential pressure facilitates moving the first piston 261 in the first direction D1.

Figure 5:
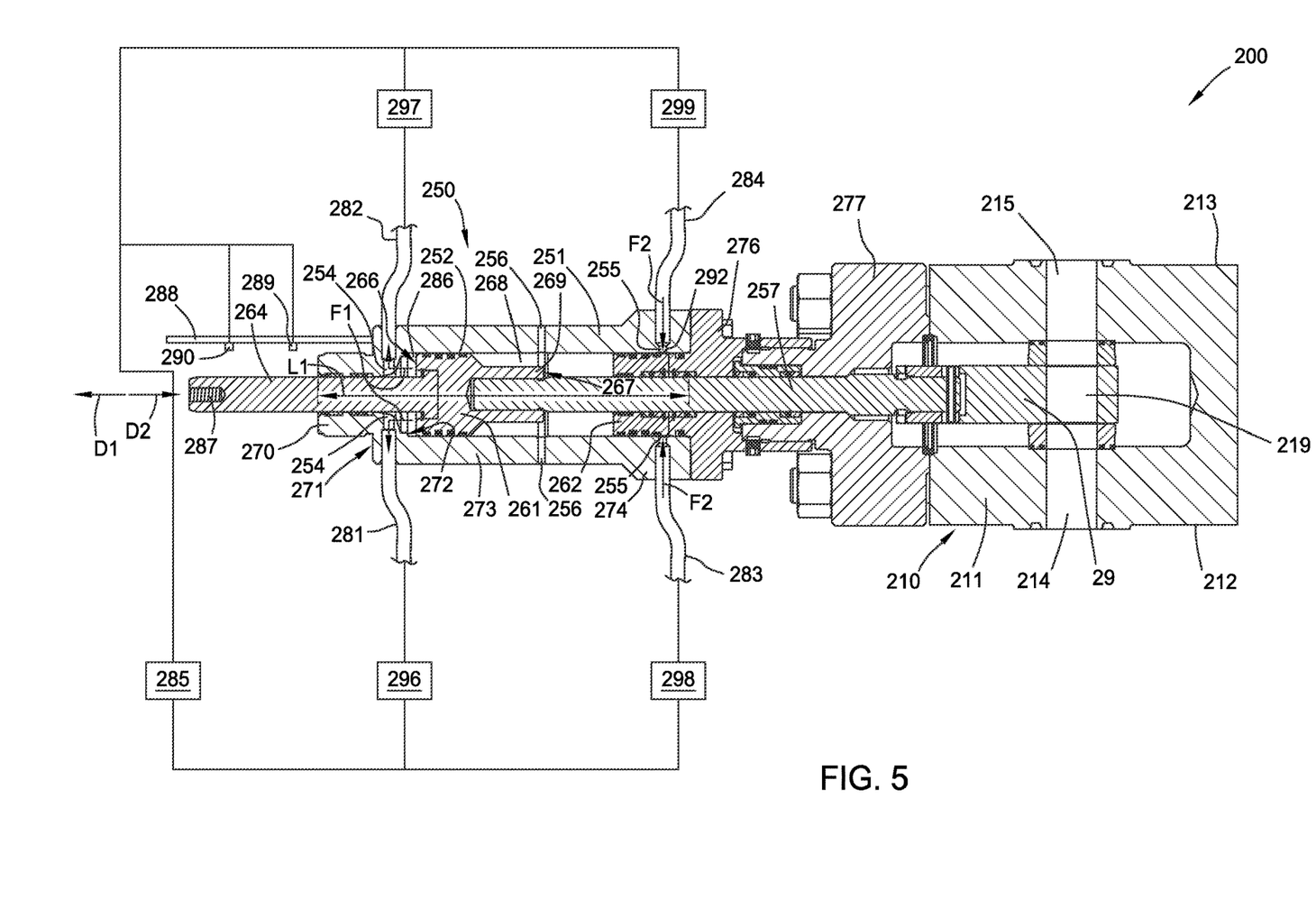
FIG. 5 is a schematic cross-sectional view, along Section 4-4, of the valve system shown in FIGS. 2 and 3 in an open position, according to one implementation.

FIG. 5 is a schematic cross-sectional view, along Section 4-4, of the valve system 200 shown in FIGS. 2 and 3, according to one implementation. The valve system 200 is shown in a second position that is at least partially open in FIG. 5.

The valve system 200 includes a target 287 coupled to the actuator stem 264, a mount plate 288 coupled to the outer housing 251, a first switch 289 mounted to the mount plate 288, and a second switch 290 mounted to the mount plate 288 and spaced from the first switch 289. Each of the first switch 289 and the second switch 290 is a magnetic proximity switch configured to recognize the target 287. The target 287 is a magnet. In one embodiment, which can be combined with other embodiments, the mount plate 288 is a bracket, such as an L-shaped bracket. The first switch 289 is closer to the outer housing 251 than the second switch 290.

The controller 285 is in communication with the first switch 289 and the second switch 290. The releasing of the first pressurized fluid F1 through the one or more first fluid openings 254 and from the first chamber volume 286 includes moving the target 287 in the first direction D1 past the first switch 289. If the target 287 moves past the first switch 289 in the first direction D1 and does not move past the second switch 290, then the instructions of the controller 285 initiate supplying of a second pressurized fluid F2 through the one or more second fluid openings 255 and to a second chamber volume 292 between the second piston 262 and the outer housing 251. The target 287 might move past the first switch 289 in the first direction D1 but not move past the second switch 290 upon, for example, a failure and/or an obstruction in relation to the valve system 200. In such an embodiment, the second pressurized fluid F2 facilitates biasing the second piston 262 against the first piston 261 to move the target 287 past the second switch 290.

If the target 287 moves past the first switch 289 and the second switch 290 (as shown in FIG. 5), the instructions of the controller 285 initiate supplying of the second pressurized fluid F2 through the one or more second fluid openings 255 and to the second chamber volume 292 upon a determination that the target 287 moves in reverse past the second switch 290 in a second direction D2 that is opposite of the first direction D1. The target 287 might move past the second switch 290 in the second direction D2, for example, upon a failure and/or an obstruction in relation to the valve system 200.

The controller 285 is in communication with the first switch 289 and the second switch 290 to detect movement of the target 287. The controller 285 is in communication with one or more first fluid sources 296, 297 and one or more second fluid sources 298, 299 to control the supply of and the exhausting of the first pressurized fluid F1 and the second pressurized fluid F2 to and from the outer housing 251. One or more vacuum sources may be used in relation to the first pressurized fluid F1 and the second pressurized fluid F2. The controller 285 controls the respective movement of the first piston 261 and the second piston 262. The controller 285 uses the first and second switches 289, 290 to detect movement of the target 287 and determine if a failure and/or an obstruction exists in relation to the valve system 200.

Using the one or more first fluid openings 254, the one or more second fluid openings 255, and the one or more ambient openings 256, the fail open actuator assembly 250 facilitates correcting for a failure and/or an obstruction of the valve system 200. The fail open actuator assembly 250 can correct for a failure and/or an obstruction by fully opening and/or fully closing the valve 210.

Figure 6:
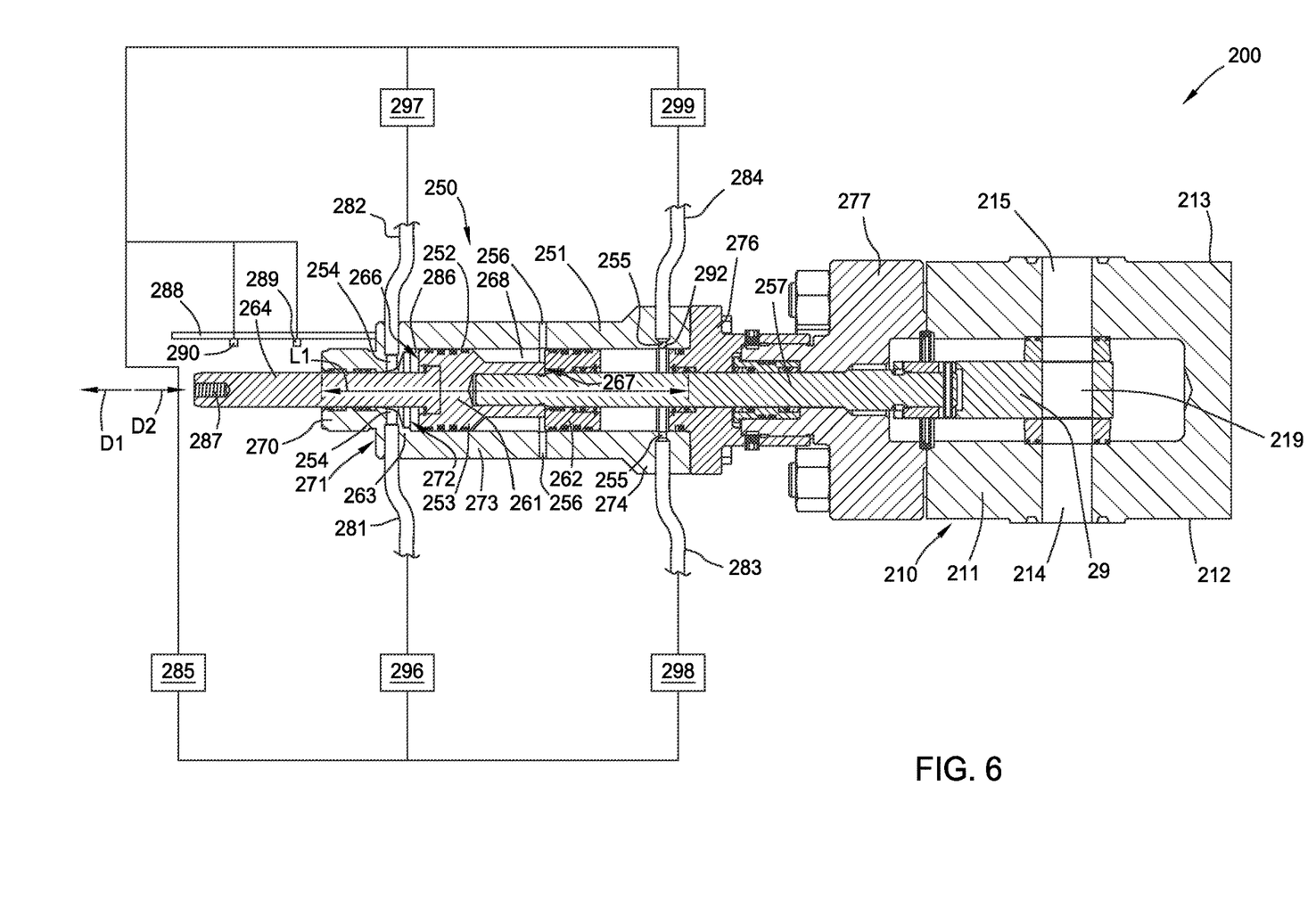
FIG. 6 is a schematic cross-sectional view, along Section 4-4, of the valve system shown in FIGS. 2 and 3 in an open position, according to one implementation.

FIG. 6 is a schematic cross-sectional view, along Section 4-4, of the valve system 200 shown in FIGS. 2 and 3, according to one implementation. In FIG. 6, the second piston 262 has moved from a first position (shown in FIGS. 4 and 5) to a second position shown in FIG. 6. The second piston 262 contacts and forces the first piston 261 (which is connected to the in the first direction D1 to ensure the valve 210 remains open. The fail open actuator assembly 250 shown in FIGS. 2-6 can be used to actuate one or more of the valves of the separation system 100, such as the first fail open valve 113 and/or the second fail open valve 114. The actuator assembly 250 shown in FIGS. 2-6 can be modified to move the valve 210 from an open position to a closed position. For example, the actuator assembly 250 shown in FIGS. 2-6 can be modified to actuate one or more of the valves of the separation system 100, such as the fail close valve 115.

Figure 7:
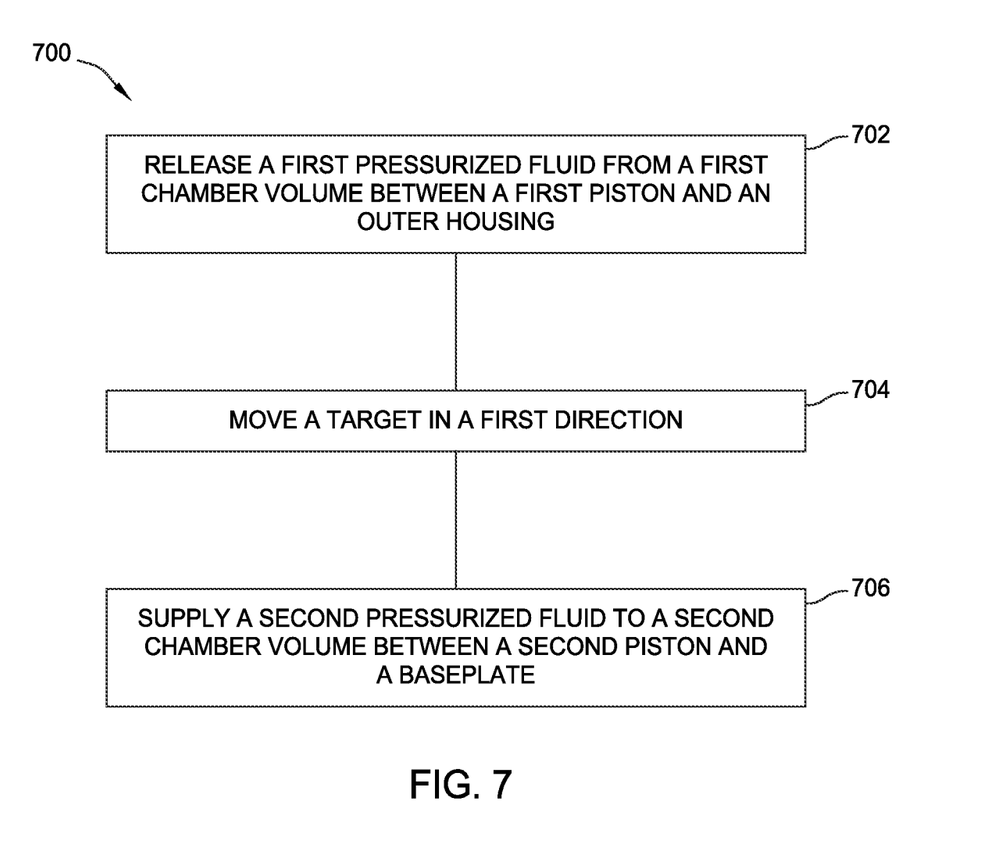
FIG. 7 is a schematic block diagram view of a method of actuating a valve, according to one implementation.

FIG. 7 is a schematic block diagram view of a method 700 of actuating a valve, according to one implementation. Operation 702 includes releasing a first pressurized fluid from a first chamber volume between a first piston and an outer housing. The first pressurized fluid is released through one or more first fluid openings formed in the outer housing. The first piston is disposed in the outer housing. The releasing of the first pressurized fluid includes pressurizing a second side of the first piston relative to a first side of the first piston using an ambient pressure through one or more ambient openings formed in the outer housing. The releasing of the first pressurized fluid includes moving the first piston to move a valve stem coupled to the first piston to an open position.

Operation 704 includes moving a target coupled to an actuator stem in a first direction past a first switch. Operation 706 includes supplying a second pressurized fluid to a second chamber volume between the outer housing and a second piston disposed in the outer housing. The second pressurized fluid is supplied through one or more second fluid openings formed in the outer housing.

The supplying of the second pressurized fluid includes moving the second piston to stop the second piston against the first piston. The moving of the second piston includes translating the second piston relative to the valve stem. The first piston includes a head portion and a rod portion. The moving of the second piston stops the second piston against the rod portion of the first piston. In one embodiment, which can be combined with other embodiments, the method 700 includes, after stopping the second piston against the first piston, supplying the second pressurized fluid to move the second piston and the first piston toward an inner shoulder portion of the outer housing.

In one embodiment, which can be combined with other embodiments, the target moves in the first direction past a second switch spaced from the first switch at operation 704, and the supplying of the second pressurized fluid to the second chamber volume at operation 706 initiates upon a determination that the target moves past the second switch in a second direction that is opposite of the first switch.

In one embodiment, which can be combined with other embodiments, the supplying of the second pressurized fluid to the second chamber volume at operation 706 initiates upon a determination that the target has not moved past the second switch in the first direction at operation 704.

Benefits of the present disclosure include enhanced operation during failures, reliable achievement of flow rates, modularity in application for actuating valves, variances in flow rates, and variances in fluids used. Benefits also include reliably accounting for failures and/or obstructions of valves in operation, reduced expenditure of resources, reduced costs, enhanced efficiencies, automated flow control, and reduced expenditure of personnel for manual operations.

It is contemplated that one or more of the aspects disclosed herein may be combined. Moreover, it is contemplated that one or more of these aspects may include some or all of the aforementioned benefits. As an example, the present disclosure contemplates that one or more aspects, features, operations components, and/or properties of the separation system 100, the valve system 200, the fail open actuator assembly 250, and/or the method 700 may be combined. For example, one or more of the operations described for the valve system 200 and the fail open actuator assembly 250 can be combined with one or more of the operations 702, 704, 706 described for the method 700.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:
1. A valve system, comprising:
an actuator assembly, comprising:
    an outer housing comprising an inner surface at least partially defining an internal volume,
    a baseplate coupled to the outer housing,
    one or more first fluid openings formed in the outer housing,
    one or more second fluid openings formed in the outer housing,
    one or more ambient openings formed in the outer housing,
    a valve stem disposed at least partially in the internal volume,
    an actuator stem disposed at least partially in the internal volume,
    a first piston disposed in the internal volume and coupled to the valve stem and the actuator stem, and
    a second piston disposed in the internal volume and disposed about the valve stem;
one or more first hydraulic lines in fluid communication with the one or more first fluid openings;
one or more second hydraulic lines in fluid communication with the one or more second fluid openings; and
a controller configured to release a first pressurized fluid through the one or more first fluid openings and from a first chamber volume between the first piston and the outer housing, and to supply a second pressurized fluid through the one or more second fluid openings and to a second chamber volume between the outer housing and the second piston,
wherein:
the releasing of the first pressurized fluid through the one or more first fluid openings and from the first chamber volume comprises moving a target in a first direction past a first switch and a second switch; and
the controller initiates the supplying of the second pressurized fluid through the one or more second fluid openings and to the second chamber volume upon a determination that the target moves past the second switch in a second direction that is opposite of the first direction.

2. The valve system of claim 1, further comprising:
the target being coupled to the actuator stem;
a mount plate coupled to the outer housing;
the first switch being mounted to the mount plate; and
the second switch being mounted to the mount plate and spaced from the first switch.

3. The valve system of claim 2, wherein each of the first switch and the second switch is a magnetic proximity switch configured to recognize the target.

4. The valve system of claim 3, wherein the controller is in communication with the first switch and the second switch.

5. An actuator assembly for valves, comprising:
an outer housing comprising an inner surface at least partially defining an internal volume;
one or more first fluid openings formed in the outer housing;
one or more second fluid openings formed in the outer housing;
one or more ambient openings formed in the outer housing;

a valve stem disposed at least partially in the internal volume;

a first piston disposed in the internal volume and coupled to the valve stem, wherein a first pressurized fluid is released from a first chamber of the internal volume through the one or more first fluid openings to move the first piston in a first direction, and to move a target in the first direction past a first switch and a second switch;

a second piston disposed in the internal volume and disposed about the valve stem; and a controller configured to initiate a supplying of a second pressurized fluid through the one or more second fluid openings to a second chamber of the internal volume to move the second piston in the first direction and into contact with the first piston, wherein the controller initiates the supplying of the second pressurized fluid upon a determination that the target moves past the second switch in a second direction that is opposite of the first direction.

6. The fail open actuator assembly of claim 5, wherein the outer housing further comprises an inner shoulder portion, and the first piston is disposed between the second piston and the inner shoulder portion.

7. The fail open actuator assembly of claim 6, further comprising an actuator stem coupled to a first side of the first piston, wherein the valve stem is coupled to a second side of the first piston.

8. The fail open actuator assembly of claim 7, wherein the first piston comprises a head portion and a rod portion, the actuator stem is coupled to the head portion, and the valve stem is coupled to the rod portion.

9. The fail open actuator assembly of claim 6, wherein the one or more ambient openings are disposed between the one or more first fluid openings and the one or more second fluid openings along a longitudinal length of the outer housing.

10. The fail open actuator assembly of claim 9, wherein the outer housing further comprises:

an outer protruding portion extending relative to a first side of the inner shoulder portion;

a sleeve portion extending relative to a second side of the inner shoulder portion; and an outer shoulder portion.

11. The fail open actuator assembly of claim 10, wherein the sleeve portion extends between the outer shoulder portion and the inner shoulder portion, and the sleeve portion and the outer shoulder portion have the inner surface.

12. The fail open actuator assembly of claim 10, wherein the one or more first fluid openings are formed in the inner shoulder portion.

13. The fail open actuator assembly of claim 12, wherein the one or more ambient openings are formed in the sleeve portion.

14. The fail open actuator assembly of claim 13, wherein the one or more second fluid openings are formed in the outer shoulder portion.

15. A method of actuating a valve, comprising:

releasing a first pressurized fluid from a first chamber volume between a first piston and an outer housing, the first pressurized fluid released through one or more first fluid openings formed in the outer housing, the first piston is disposed in the outer housing, and the releasing of the first pressurized fluid comprising:

pressurizing a second side of the first piston relative to a first side of the first piston using an ambient pressure through one or more ambient openings formed in the outer housing, and moving the first piston to move a valve stem coupled to the first piston to an open position or a closed position;

supplying a second pressurized fluid to a second chamber volume between the outer housing and a second piston disposed in the outer housing, the second pressurized fluid supplied through one or more second fluid openings formed in the outer housing, and the supplying of the second pressurized fluid comprising:

moving the second piston to stop the second piston against the first piston, the moving of the second piston comprising translating the second piston relative to the valve stem; and moving a target in a first direction past a first switch and a second switch spaced from the first switch, wherein the supplying of the second pressurized fluid to the second chamber volume initiates upon a determination that the target moves past the second switch in a second direction that is opposite of the first direction.

16. The method of claim 15, wherein the first piston comprises a head portion and a rod portion, and the moving of the second piston stops the second piston against the rod portion of the first piston.

17. The method of claim 15, further comprising, after stopping the second piston against the first piston, supplying the second pressurized fluid to move the second piston and the first piston toward an inner shoulder portion of the outer housing.

18. The method of claim 17, wherein the target is coupled to an actuator stem of the valve.

* * * * *